United States Patent
Bandur Puttappa et al.

(10) Patent No.: US 10,713,189 B2
(45) Date of Patent: Jul. 14, 2020

(54) SYSTEM AND METHOD FOR DYNAMIC BUFFER SIZING IN A COMPUTING DEVICE

(71) Applicant: QUALCOMM INCORPORATED, San Diego, CA (US)

(72) Inventors: Vasantha Kumar Bandur Puttappa, Bangalore (IN); Umesh Rao, Bangalore (IN); Kunal Desai, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/634,701

(22) Filed: Jun. 27, 2017

(65) Prior Publication Data

US 2018/0373652 A1    Dec. 27, 2018

(51) Int. Cl.
| | | |
|---|---|---|
| G06F 11/30 | (2006.01) | |
| G06F 13/16 | (2006.01) | |
| H04B 1/3827 | (2015.01) | |
| G06F 15/78 | (2006.01) | |
| G06F 5/06 | (2006.01) | |
| G06F 1/32 | (2019.01) | |

(52) U.S. Cl.
CPC ............ *G06F 13/1673* (2013.01); *G06F 5/06* (2013.01); *G06F 11/3024* (2013.01); *G06F 15/7807* (2013.01); *H04B 1/3827* (2013.01); *G06F 2205/063* (2013.01)

(58) Field of Classification Search
USPC .............. 710/18, 56, 310; 713/324; 718/104
See application file for complete search history.

(56) References Cited

U.S. PATENT DOCUMENTS

| | | | |
|---|---|---|---|
| 6,657,634 B1 * | 12/2003 | Sinclair | ................. G06F 1/3218 345/534 |
| 8,064,256 B2 | 11/2011 | Norman | |
| 9,189,199 B2 | 11/2015 | Alfieri | |
| 9,337,952 B2 | 5/2016 | Paul et al. | |

(Continued)

FOREIGN PATENT DOCUMENTS

WO    2007107938 A1    9/2007

OTHER PUBLICATIONS

Carroll A., et al., "An Analysis of Power Consumption in a Smartphone," USENIX, May 14, 2010, pp. 1-14, XP061009451.

(Continued)

*Primary Examiner* — Ilwoo Park
(74) *Attorney, Agent, or Firm* — Smith Tempel Blaha LLC/Qualcomm

(57) ABSTRACT

Methods and systems for dynamically controlling buffer size in a computing device in a computing device ("PCD") are disclosed. A monitor module determines a first use case for defining a first activity level for a plurality of components of the PCD. Based on the first use case, a plurality of buffers are set to a first buffer size. Each of the buffers is associated with one of the plurality of components, and the first buffer size for each buffer is based on the first activity level of the associated component. A second use case for the PCD, different from the first use case, is determined. The second use case defines a second activity level for the plurality of components. At least one of the buffers is set to a second buffer size different from the first buffer size based on the second use case.

30 Claims, 9 Drawing Sheets

| Use Case | GPU | Display | Camera | Modem | Video Encoder | Memory Controller |
|---|---|---|---|---|---|---|
| Gaming | F0 | F0 | F1 | F1 | F3 | F0 |
| Camera | F2 | F0 | F0 | F1 | F1 | F0 |
| Video Play | F1 | F0 | F2 | F1 | F0 | F1 |
| Start Up | F2 | F2 | F2 | F2 | F2 | F2 |
| Default | F2 | F1 | F3 | F0 | F3 | F2 |

| State | FIFO Size Reduction |
|---|---|
| F0 | 0% |
| F1 | 25% |
| F2 | 50% |
| F3 | 75% |
| F4 | 65% |

(56) References Cited

U.S. PATENT DOCUMENTS

| | | | |
|---|---|---|---|
| 2008/0162862 A1* | 7/2008 | Matsumoto | G11B 20/10527 |
| | | | 711/171 |
| 2009/0028171 A1 | 1/2009 | Cousson et al. | |
| 2012/0316471 A1* | 12/2012 | Rahman | A61B 5/0008 |
| | | | 600/595 |
| 2013/0223538 A1* | 8/2013 | Wang | H04N 21/4307 |
| | | | 375/240.25 |
| 2014/0281341 A1* | 9/2014 | Bhat | G06F 5/10 |
| | | | 711/171 |
| 2016/0026436 A1 | 1/2016 | Shen | |
| 2016/0026549 A1* | 1/2016 | Alshinnawi | G06F 11/2015 |
| | | | 714/14 |
| 2016/0274187 A1* | 9/2016 | Menon | G01R 31/31718 |

OTHER PUBLICATIONS

International Search Report and Written Opinion—PCT/US2018/035677—ISA/EPO—dated Aug. 28, 2018.
Vestias M.P., et al., "A Dynamic Buffer Resize Technique for Networks-on-chip on FPGA," VII Southern Conference on Programmable Logic (SPL), Apr. 13, 2011, pp. 227-232, XP031877279.

* cited by examiner

500A

| Use Case | GPU | Display | Camera | Modem | Video Encoder | Memory Controller |
|---|---|---|---|---|---|---|
| Gaming | F0 | F0 | F1 | F1 | F3 | F0 |
| Camera | F2 | F0 | F0 | F1 | F1 | F0 |
| Video Play | F1 | F2 | F2 | F2 | F0 | F1 |
| Start Up | F2 | F2 | F2 | F0 | F2 | F2 |
| Default | F2 | F1 | F3 | F0 | F3 | F2 |

| State | FIFO Size Reduction |
|---|---|
| F0 | 0% |
| F1 | 25% |
| F2 | 50% |
| F3 | 75% |
| F4 | 65% |

FIG. 5B

SYSTEM AND METHOD FOR DYNAMIC BUFFER SIZING IN A COMPUTING DEVICE

DESCRIPTION OF THE RELATED ART

Computing devices, including desktop computers, servers, and portable computing devices ("PCDs") are ubiquitous. PCDs for example are becoming necessities for people on personal and professional levels. These devices may include cellular telephones (such as smartphones), portable digital assistants ("PDAs"), portable game consoles, palmtop computers, tablet computers, wearable and other portable electronic devices. Such PCDs commonly use memories, such as first-in-first-out buffers or memory registers acting as buffers to ensure that data is transferred between components of the PCD efficiently and without data loss. Such buffer memories are typically sized as start-up of a PCD for a "worst case" scenario, for example the buffer memories, such as FIFOs may be sized to ensure that no data is lost when a first component transferring data operates at a maximum frequency, while another component transferring data operates at a minimum frequency.

As PCDs become more powerful and are required to perform more tasks, decreasing power consumption becomes more important to ensure a satisfactory battery life. Typical prior art techniques to reduce or control power consumption include throttling or controlling a voltage level at which PCD components operate and/or a clock frequency for PCD components. However, such methods of controlling power consumption may not be effective in all circumstances, such as when multiple components of the PCD are on a single power rail such that the voltage level on the power rail may not be reduced due to the requirements of one component, while other components on the power rail could be operated at a lower voltage level.

Such methods for controlling power consumption ignore the significant power leakages that results from buffers sized to handle "worse case" scenarios. Therefore, there is a need for systems and methods to dynamically control FIFO buffer sizing in computing devices, such as PCDs.

SUMMARY OF THE DISCLOSURE

Various embodiments of methods and systems for dynamically controlling a buffer memory size in a computing device are disclosed. In an exemplary embodiment, a method is provided, the method comprising determining with a monitor module of a system on a chip ("SoC") a first use case for the PCD. The first use case defines a first activity level for a plurality of components of the SoC. The method includes setting a plurality of buffer memories to a first buffer size based on the first use case. Each of the plurality of buffers is associated one of the plurality of components of the SoC, and the first buffer size for each of the buffers is based on the first activity level of the associated component of the SoC.

The method further includes determining a second use case for the PCD different from the first use case. The second use case defines a second activity level for the plurality of components of the SoC. At least one of the plurality of buffers is set to a second buffer size based on the second use case. The second buffer size for the at least one buffer is based on the second activity level of the associated component of the SoC, and the second buffer size different from the first buffer size.

In another embodiment, a computer system for dynamically controlling buffer size in a computing device is disclosed. The exemplary system comprises a plurality of components of a system on a chip ("SoC") of the PCD; a plurality of buffers on the SoC, each of the plurality of buffers associated with one of the plurality of components; and a monitor module of the SoC. The monitor module is configured to determine a first use case for the PCD, the first use case defining a first activity level for the plurality of components of the SoC. The monitor module is also configured to set the plurality of buffers to a first buffer size based on the first use case, where the first buffer size for each of the buffers is based on the first activity level of the associated component of the SoC.

The monitor module is further configured to determine a second use case for the PCD different from the first use case, the second use case defining a second activity level for the plurality of components of the SoC. Finally, the monitor module is configured to set at least one of the plurality of buffers to a second buffer size based on the second use case. The second buffer size for the at least one buffer is based on the second activity level of the associated component of the SoC, and the second buffer size different from the first buffer size.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 5A is an exemplary state table which may be used during operation of a system and method for dynamic FIFO buffer sizing;

FIG. 5B is an exemplary look-up table (LUT) which may be used during operation of a system and system and method for dynamic FIFO buffer sizing;

DETAILED DESCRIPTION

Figure 1:
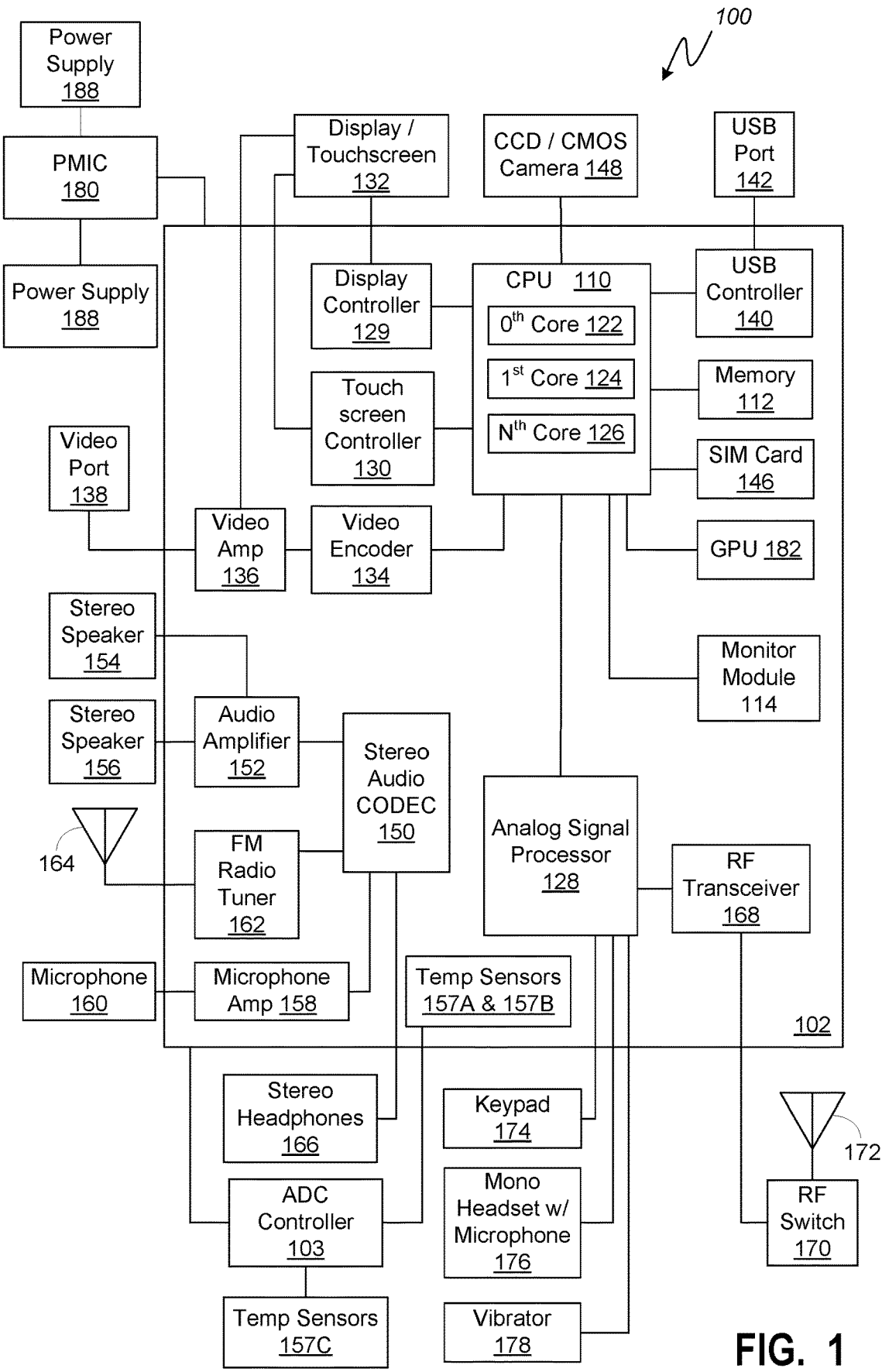
FIG. 1 is a functional block diagram illustrating an example embodiment of a portable computing device (PCD) in which systems and methods for dynamic first-in-first-out (FIFO) buffer sizing can be implemented.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)."

In this description, the terms "workload," "process load" and "process workload" are used interchangeably and generally directed toward the processing burden, or percentage of processing burden, associated with a given processing component in a given embodiment, such as when that processing component is executing one or more task or instruction. Further, a "processing component" may be, but is not limited to, a system-on-a-chip ("SoC"), a central processing unit, a graphical processing unit, a core, a main core, a sub-core, a processing area, a hardware engine, a camera, a modem, etc. or any other component residing within, or external to, an integrated circuit within a portable computing device.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a tablet computer, a combination of the aforementioned devices, a laptop computer with a wireless connection, and/or wearable products, among others.

In PCDs, competing quality of service, battery life, and other concerns can lead to various components, systems, and/or subsystems of the PCD to be operated at higher (or lower) power or voltage and/or higher (or lower) frequency. Additionally, PCDs typically include one or more buffer memories to assist in data negotiation between the various components, systems, and/or subsystems of the PCDs. However, these buffer memories or buffers are typically set or sized at the initial start-up or operation of the PCD and remain static in size, leading to excess power leakage when the buffer is not used. Such power loss can be especially significant in buffers that are sized for a "worst case" scenario, such as buffers sized to ensure that data is not lost when a component transmitting data operates at maximum frequency while a component receiving the data operates at a minimum frequency. This power loss from buffer size is not accounted for in traditional power control strategies focused on operating frequency and/or voltages of the PCD components.

It has been determined that the ability to dynamically control the size of buffers used by the PCD components and/or subsystems can lead to substantial power savings beyond the power savings gained by traditional voltage/frequency control of the PCD components/subsystems. Additionally, dynamically sizing the buffers can provide power savings when traditional voltage/frequency based power control methods will not, such as when the voltage of an inactive component cannot be reduced because that component shares a power rail with an active component. Thus, the present systems and methods for dynamically sizing buffers or buffer memories provide a cost effective ability to either enhance power savings or to realize power savings when traditional voltage/frequency power savings methods are ineffective.

The system and methods for data path aware thermal management described herein, or portions of the system and methods, may be implemented in hardware or software. If implemented in hardware, the systems, or portions of the systems can include any, or a combination of, the following technologies, which are all well known in the art: sensors, discrete electronic components, integrated circuits, application-specific integrated circuits having appropriately configured semiconductor devices and resistive elements, etc. Any of these hardware devices, whether acting or alone, with other devices, or other components such as a memory may also form or comprise components or means for performing various operations or steps of the disclosed methods.

When a system or method described herein is implemented, or partially implemented, in software, the software portion can be used to perform the methods described herein. The software and data used in representing various elements can be stored in a memory and executed by a suitable instruction execution system (e.g. a microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions FIG. 1 is a functional block diagram illustrating an example embodiment of a portable computing device (PCD) in which systems and methods for data path aware thermal management can be implemented. As shown, the PCD 100 includes an on-chip system ("SoC") 102 that includes a multi-core central processing unit ("CPU") 110 and an analog signal processor 128 that are coupled together. The CPU 110 may comprise multiple cores including a zeroth core 122, a first core 124, up to and including, an Nth core 126. Further, instead of a CPU 110, a digital signal processor ("DSP") may also be employed as understood by one of ordinary skill in the art. As will be understood, the cores 122, 122, 126 may be implemented to execute one or more instructions or tasks, such as instructions or tasks of an application being run by the PCD 100. As will also be understood, such instructions or tasks may instead, or may additionally, be executed by or on one or more additional processing components, such as GPU 182 illustrated in FIG. 1.

In an embodiment, a monitor module 114 may be implemented to communicate with the first-in-first-out (FIFO) buffers (not illustrated in FIG. 1) implemented by various components PCD 100 during operation, as well as with other components of the SoC 102, such as CPU 110 or GPU 182, etc. The monitor module 114 may also in some embodiments determine which among various FIFOs will be resized, and to what degree the FIFOs will be resized as described below. Although shown as a single component on the SoC 102 for convenience in FIG. 1, the monitor module 114 may in some embodiments comprise multiple components one, some, or all of which may not be located on the SoC 102. It is not necessary in the present disclosure for the monitor module 114 to be a component illustrated in FIG. 1, and in some embodiments the monitor module 114 may be implemented in software such as executable instructions, code, and/or parameters stored in a memory 112.

As illustrated in FIG. 1, a display controller 129 and a touch screen controller 130 are coupled to the CPU 110. A touch screen display 132 external to the SoC 102 is coupled to the display controller 131 and the touch screen controller 130. Again, although shown in FIG. 1 as single components located on the SoC 102, both the display controller 131 or touch screen controller 130 may comprise multiple components, one or more of which may not be located on the SoC 102 in some embodiments.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the CPU 110. A video amplifier 136 is coupled to the video encoder 134 and the touch screen display 132. A video port 138 is coupled to the video amplifier 136. As depicted in FIG. 1, a universal serial bus ("USB") controller 140 is coupled to the CPU 110. In addition, a USB port 142 is coupled to the USB controller 140. A memory 112 and a subscriber identity module (SIM) card 146 may also be coupled to the CPU 110. Further, as shown in FIG. 1, a digital camera 148 may be coupled to the CPU 110 of the SoC 102. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. In addition, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 128. An RF switch 170 may be coupled to the RF transceiver 168 and an RF antenna 172. As shown in FIG. 1, a keypad 174 may be coupled to the analog signal processor 128. In addition, a mono headset with a microphone 176 may be coupled to the analog signal processor 128. Further, a vibrator device 178 may be coupled to the analog signal processor 128. FIG. 1 also shows that a power supply 188, for example a battery, is coupled to the SoC 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A, 157B as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors or other desired sensors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

In the embodiment illustrated in FIG. 1, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the SoC 102.

As discussed above, in a particular aspect, one or more of the method steps described herein may be implemented by executable instructions, code, and/or parameters stored in a memory 112 that may form the monitor module 114, or other components discussed herein. The instructions that form the monitor module 114 may be executed by the CPU 110, the analog signal processor 128, or another processor, in addition to the ADC controller 103, to perform the methods described herein. Further, the CPU 110, analog signal processor 128, the memory 112, the instructions stored therein, or a combination thereof may serve as a means for performing one or more of the method steps described herein.

Figure 2:
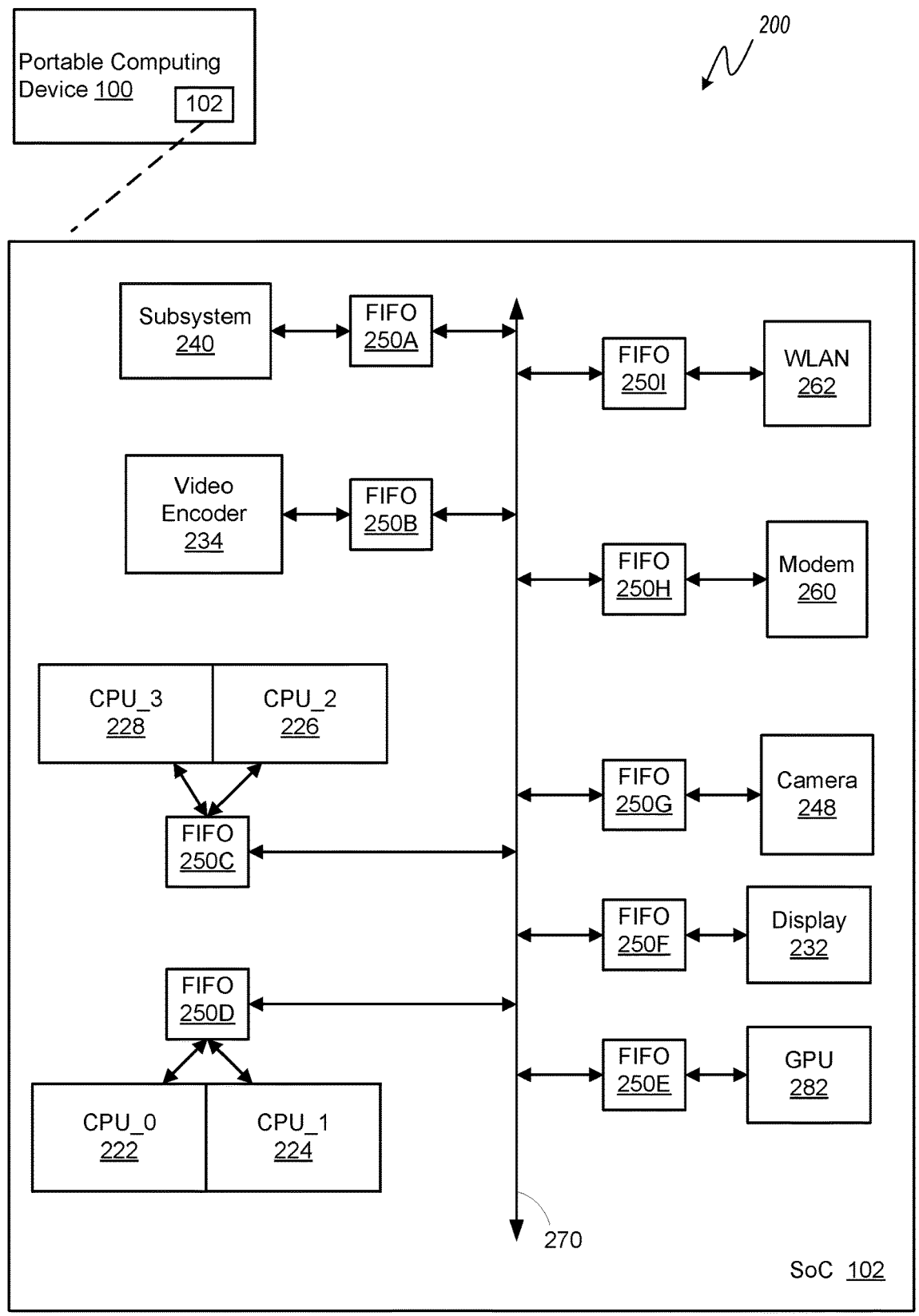
FIG. 2 is a block diagram showing exemplary components in a system on a chip (SoC) that may be implemented in a PCD.

FIG. 2 is a block diagram showing exemplary components in an SoC 102 that may be implemented in a PCD 100. The PCD 100 may in an embodiment be in the form of a wireless telephone. FIG. 2 is for illustrative purposes, and shows an exemplary arrangement of certain hardware components of the exemplary PCD 100, the hardware components depicted in block form and electrically coupled to each other via a communication path such an interconnect or bus 270.

Bus 270 may include multiple communication paths via one or more wired or wireless connections. Depending on the implementation, bus 270 may include additional elements, which are omitted for simplicity, such as controllers, drivers, repeaters, and receivers, to enable communications. Further, bus 270 may include address, control, and/or data connections to enable appropriate communications among the various components illustrated in FIG. 2 and/or additional components of the SoC 102 and/or PCD 100 if desired. In an embodiment, bus 270 may comprise a network on chip (NOC) bus 270.

As illustrated in FIG. 2, the SoC 102 may include multiple processors or cores, including CPU_0 222, CPU_1 224, CPU_2 226, and CPU_3 228 (collectively CPUs 222-228). Although four CPUs 222-228 are illustrated, in other embodiments the SoC 102 may have more or fewer CPUs 222-228 and/or the CPUs 222-228 may be arranged differently than illustrated in FIG. 2. Additionally, the SoC 102 may have a different architecture for the processing components than illustrated in FIG. 2, such as a "big—little" architecture with each of CPUs 222-228 comprising two separate processing components of different sizes. The present disclosure is equally applicable to all such architecture variations.

As also illustrated in FIG. 2, the SoC 102 may also comprise a separate GPU 282 for processing or executing graphics-related workloads, such as rendering graphical information to a user display 232. Similarly, the SoC 102 may include a video encoder 234 for encoding or decoding video files. Although not illustrated, the SoC 102 may also include a separate audio encoder for encoding or decoding audio files and/or the audio portions of video files. SoC 102 may also include one or more cameras illustrated as camera 248 in FIG. 2. Similarly, SoC 102 may include one or more components to allow communications between the PCD 100 and other computer devices and systems. Such communication components may include modem 260 and/or wide area LAN (WLAN) 262.

SoC 102 will also include one or more subsystems 240 to support the components listed above and/or to perform other functionality for the SoC 102 or PCD 100. As will be understood, these subsystems (illustrated for convenience as a single subsystem 240) may include various components or logic configured to work in conjunction with or to work independently of the above-identified components of SoC 102. For example, in an embodiment subsystem 240 may comprise a low-power audio subsystem (LPASS) for handling audio data for the SoC 102. Similarly, in an embodiment subsystem 240 may include a video subsystem for handling video data for the SoC 102, such as video data to be encoded by video encoder 234 and/or video data to be rendered by GPU 282. SoC 102 may in various embodiments include more subsystems than subsystem 240 illustrated.

Finally, in the embodiment illustrated in FIG. 2, the SoC 102 includes one or more buffers (250A-250I). Buffers 250A-250I allow for buffering of data before it is read by the respective component or subsystem illustrated in FIG. 2 to which each buffer 250A-250I is coupled. As will be understood, buffers 250A-250I may be implemented as any desired buffer or memory structure (e.g. any memory type other than SRAM and DRAM) such as a first-in-first-out (FIFO) buffer. For convenience, the buffers are illustrated as FIFOs 250A-250I in the exemplary embodiments discussed below. However, the discussion below and the present disclosure are equally applicable to any storage or memory type of method used for buffering. As will also be understood, the representation of separate FIFOs 250A-250I in FIG. 2 is illustrative. FIFOs 250A-250I may in other embodiments not be physically separate buffers or components of the SoC 102. For example, FIFOs 250A-250I may not be separate from the components, but may instead be a part of the component for which a FIF 250A-250I provides buffering. In such embodiments a particular buffer, such as FIFO 250A, may be considered part of the component (subsystem 240) for which FIFO 250A provides buffering—i.e. inside the box representing subsystem 240 in FIG. 2. In other embodiments FIFOs 250A-250I may be implemented as a series of memory registers or a series of addresses in a single memory, with each series of memory registers or addresses designated to act as a FIFO 250A-250I for a particular component.

Additionally, as illustrated by FIFO 250C and FIFO 250D one or more components of the SoC 102 may share a buffer, although in some embodiments each component will have its own buffer. As will be understood, the SoC 102 may have more or fewer components and subsystems than those illustrated in FIG. 2 and/or the spatial arrangement of the components or subsystems may arranged differently than the illustrative arrangement shown in FIG. 2.

Figure 3:
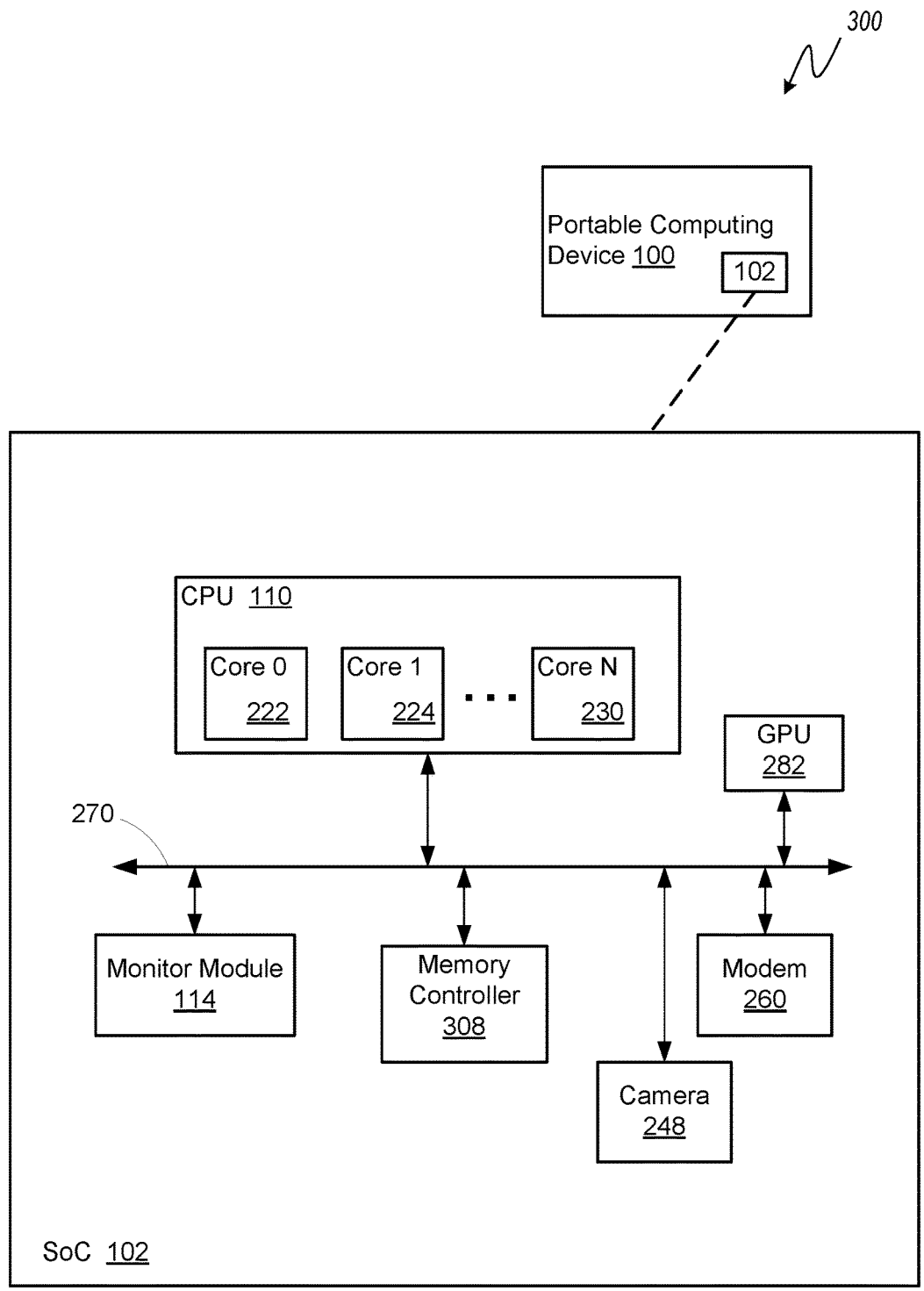
FIG. 3 is a block diagram showing aspects of an exemplary embodiment of a system for dynamic FIFO buffer sizing in a computing device.

Turning to FIG. 3, a block diagram showing aspects of an exemplary embodiment of a system 300 for dynamic FIFO buffer sizing is illustrated. The system 300 may be implemented on an SoC 102 having the exemplary components 200 of SoC 102 illustrated in FIG. 2. Additionally, the SoC 102 of system 300 may be the SoC 102 of PCD 100 illustrated in FIG. 1. As illustrated in FIG. 3, the SoC 102 includes a CPU 110 with multiple processing components such as cores 222, 224, 230, which may correspond in an embodiment to CPUs 222-228 of FIG. 2. CPU 110 is electrically coupled to a communication path such an interconnect or bus 270 such as the bus 270 described above for FIG. 2. SoC 102 may also include GPU 282, modem 260, and camera 248 electrically coupled to the bus 270.

The system 300 includes a memory controller 308 in communication with bus 270, the memory controller 308 configured to control the memories on or coupled to SoC 102, including the system memory 112 (FIG. 1) and certain aspects of the FIFOs 250A-250I (FIG. 2). Although not illustrated, system 300 may also include various drivers for the components of SoC 102 containing configuration and operation information about the components of SoC 102. Such drivers may be distributed among and/or co-located with the various components to which a particular driver applies.

System 300 also includes a monitor module 114 in communication with the bus 270. In an embodiment the monitor module 114 may operate to determine when to resize one or more FIFO 250A-250I (FIG. 2) and/or to determine the amount one or more FIFOs 250A-250I will be resized. Although shown as a single component on the SoC 102 in FIG. 2, the monitor module 114 may in some embodiments comprise multiple components and/or the functionality of the monitor module 114 discussed herein may be distributed among various components of the SoC 102. In other embodiments, the monitor module 114 may not be a component at all as illustrated in FIG. 2, but instead the monitor module 114 may be implemented in software such as executable instructions, code, and/or parameters stored in a memory of the SoC 102.

Regardless of how implemented, to make the determinations about when and/or how to resize the buffers, monitor module 114 may receive or obtain information from various components to determine or understand a use case for the PCD 100. Monitor module 114 may similarly receive or obtain information from various components to determine or understand a change from a first use case to a second use case that would justify resizing of one or more buffers. In an embodiment, a use case is a way or manner to categorize how the PCD 100 is being used. A use case provides information about (or may be defined by) an activity level, or expected activity level, of various components of the PCD 100 or SoC 102 during that use case.

Exemplary use cases may include gaming, video playback, communication (such as texting or a telephone call), computational activity, camera (such as taking pictures); video taking (which may be a subset of the camera use case or a separate use case); music (which may including playing music files saved to the PCD 100 and/or streaming music to the PCD 100); browsing the internet; backing-up the PCD 100; start-up (such as when the PCD 100 is powering up after being turned off); default (which may be a default use case when other use cases do not apply); or other use cases. Additionally, in some embodiments, new use cases may be defined or created based on how the PCD 100 is used over a period of time. In such embodiments, the new use case(s) may be defined or created by the monitor module 114.

Determining which use case applies to the PCD 100 at a particular time may be based on knowledge of or information about the applications or programs being executed by the PCD 100, or that are about to be executed by the PCD 100. This knowledge or information may be direct (such as software understanding which applications, instructions, or code are executing on the SoC 102) or may be inferred (such as based on user inputs). In some implementations, determining which use case applies to the PCD 100 at a particular time may additionally, or instead, be based on current status information about the PCD 100, such as the activity level of one or more components in the PCD 100 or SoC 102 (such as GPU 282, camera 248, modem 260, video encoder 232, etc.). In yet other implementations, the use case that applies to the PCD 100 at a particular time may be based on a particular triggering event, such as re-starting the PCD 100 or SoC 102 from a powered-off state.

Regardless of how determined or understood, each use case will be associated with an expected or anticipated activity level for one or more components of the SoC 102 and/or PCD 100. For example, a "camera" use case may be where the camera and/or a camera application have been activated by the user of the PCD 100. For such a use case, it may be expected that the camera (such as camera 248 of FIG. 2 and FIG. 3) and the display (such as display 232 of FIG. 2), and any supporting subsystems, will be active. It may also be expected that for the "camera" use case, the modem 260, GPU 282, video encoder 234, as well as other components of SoC 102 (FIG. 2) may not be active, or will be less active than in other use cases.

Figure 4A:
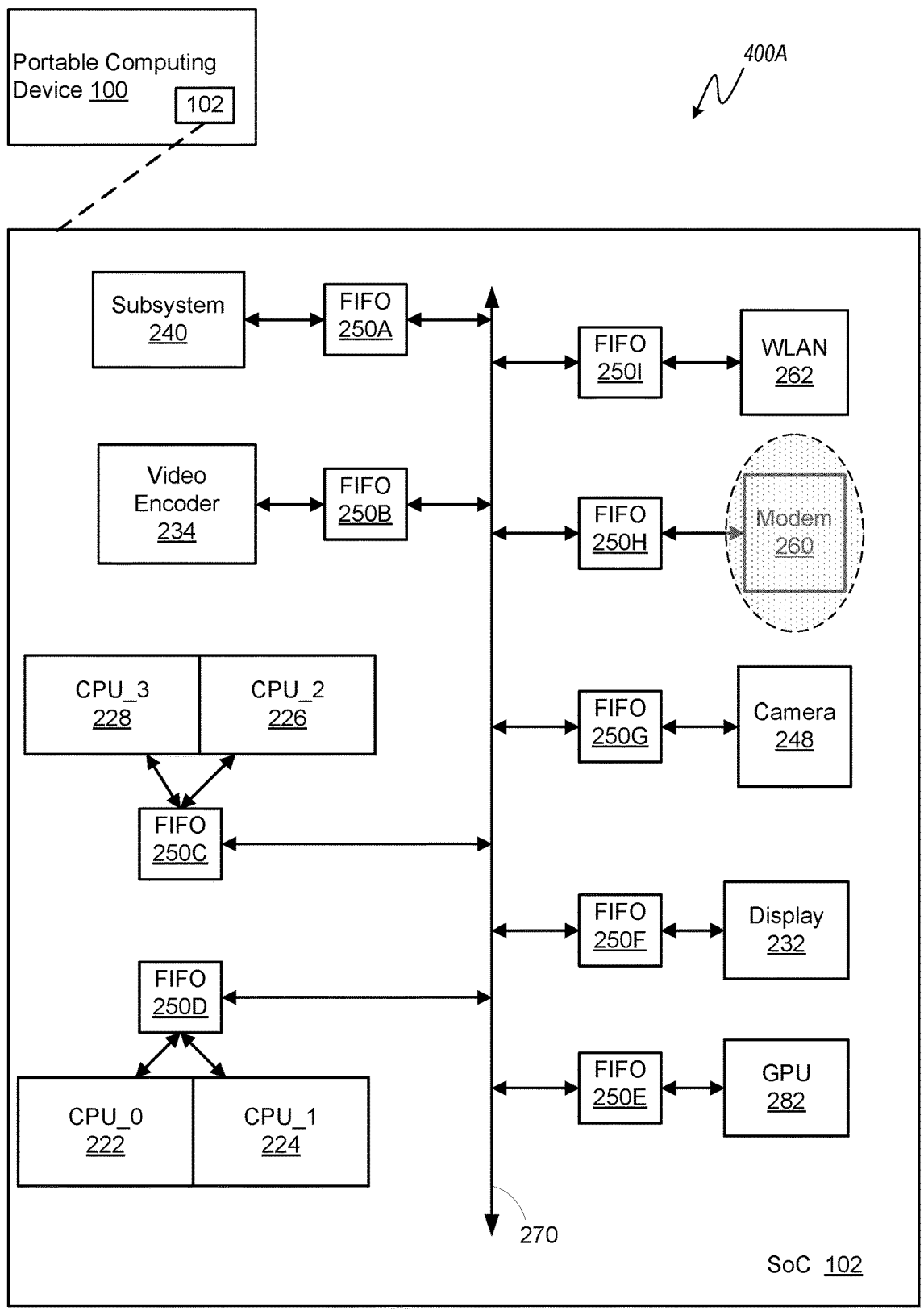
FIG. 4A is the block diagram of FIG. 2, on which an example of the operation of a system and method for dynamic FIFO buffer sizing is illustrated for a use case.

By way of another example, a "communication" use case may be where the modem and/or a communication application using the modem have been activated by the user of the PDC 100. FIG. 4A is the block diagram of FIG. 2, on which an example of the operation of a system and method for dynamic FIFO buffer sizing is illustrated for an exemplary "communication" use case. For such a use case, it may be expected that the modem 260 and any supporting subsystems will be active as represented by the shaded region of FIG. 4A. The buffer for such active components like the modem 260 (FIFO 250H) will be sized to accommodate the expected activity level—i.e. relatively larger buffer depth.

By contrast, it may be expected that the remaining components of SoC 102 (unshaded) may not be active, or will be less active for this "communication" use case. The buffers for such inactive components like camera 248 (FIFO 250G) and GPU 282 (FIFO 250F) will be sized to accommodate the expected inactivity—i.e. smaller buffer depths. Thus, for the components that are expected to be less active for this use case, the size or depth of the buffers coupled to these components may be reduced, preventing or reducing leakage power without impacting the performance of the PCD.

Note that for the "communication" use case, depending on the type of communication, the full bandwidth of the modem 260 may not be used. It will be understood that even though the full bandwidth of the modem 260 is not used, the modem 260 may be synchronous to other components (e.g. to a memory controller not illustrated in FIG. 4A) for quality of service purposes, to prevent latency, etc. In other words, modem 260 may be forced to operate at a higher frequency even though the modem 260 is using all of its bandwidth.

In such use cases, traditional power consumption techniques that control voltage or frequency of the modem 260 will not be effective since the modem 260 is synchronous to other components and/or sharing a power rail with other components. In that event, FIFO 250H may be sized relatively large but may still less than full size or depth (e.g. reduced by 25%). Such dynamic sizing of FIFO 250H allows it to accommodate the expected activity level of modem 260 while still providing power savings. In this manner, dynamic sizing of the FIFO 250H can provide for power savings without impacted the performance of SoC 102 or PCD 100 where traditional voltage/frequency based power reduction methods may be inapplicable or ineffective.

Figure 4B:
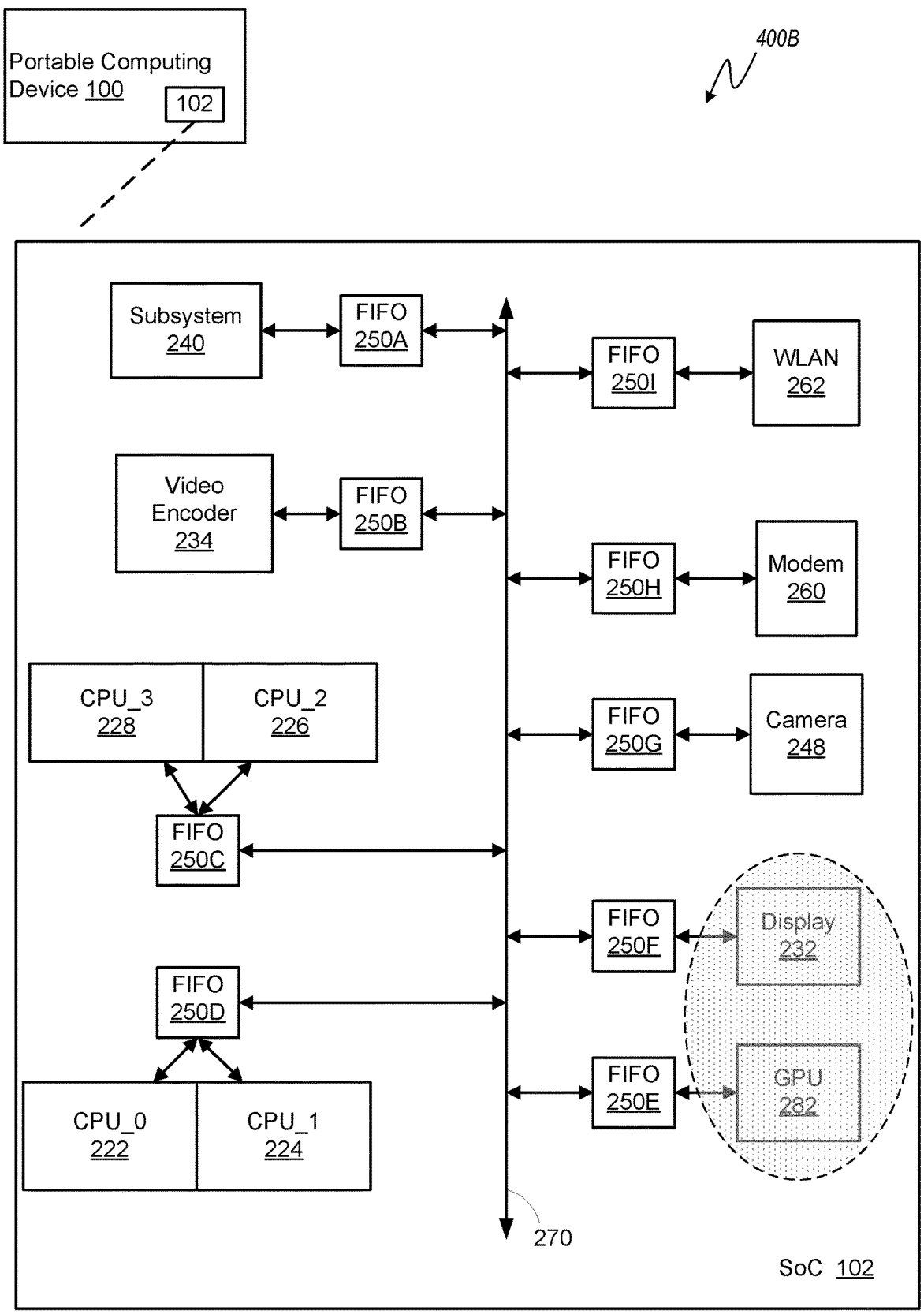
FIG. 4B is the block diagram of FIG. 2, on which an example of the operation of a system and method for dynamic FIFO buffer sizing is illustrated for a different use case.

Yet another example is a "gaming" use case where a user is executing a game application on the PCD 100. FIG. 4B is the block diagram of FIG. 2, on which an example of the operation of a system and method for dynamic FIFO buffer sizing is illustrated for an exemplary "gaming" use case. For such a use case, it may be expected that the GPU 282 and display 232 may be the most active as reflected by the shaded region of FIG. 2C. The buffers for these active components like the GPU 282 (FIFO 250E) and display 232 (FIFO 250F) will be sized to accommodate the expected activity level—i.e. relatively larger buffer depth.

For such a "gaming" use case it may be expected that the memory controller 308, CPU 222-228, modem 260, and video encoder 234 will be moderately active. The buffers for these moderately active components (FIFOs 250C, 250D, 250H) will be sized to accommodate the expected moderate activity level—i.e. at a smaller buffer depth compared to the active components. Finally, in the "gaming" use case it may be expected that the camera 248 will be inactive. The buffers for such inactive components (FIFO 250G) will be sized to accommodate the expected inactivity—i.e. at an even smaller buffer depth compared to moderate and active components. Such dynamic sizing of FIFOs 250C, 205F, 250H, and/or 250G H—and in particular the reduction of buffer size or depth for inactive or less active components of the SoC 102—allows for the prevention or reduction of leakage power without impacting the performance of the PCD 100 or SoC 102.

As illustrated by this "gaming" use case example of FIG. 4B, the activity level of various components of the SoC 102 may not necessarily be categorized as active/inactive. Instead, the activity levels for one or more use cases may be relative, or varied, with multiple levels or degrees of activity depending on the component. Note that in this "gaming" use case example, the less active or inactive components may also have their voltage and/or frequency reduced as part of a traditional power control or savings method. The dynamic sizing of the buffers in this "gaming" use case example provides additional power savings/power reduction beyond the power savings/power reductions available from traditional voltage/frequency based power reduction methods.

For implementations or use cases with relative or varied degrees of activity of the components, the information or data about the state or activity level and/or buffer size may be stored or contained in monitor module 114 or in a memory accessed by monitor module 114 or some other component of SoC 102. In an embodiment such information may be stored in a table such as state table 500A of FIG. 5A. State table 500A may include levels or states, such as F0, F1, F2, F3, etc. representing an expected activity level or state for each component of SoC 102 for each use case. State table 500A is illustrative, and in various embodiments may include more or fewer use cases, more or fewer components, and/or more or fewer activity levels/states.

In some embodiments state table 500A may be fixed, while in other embodiments monitor module 114 or another component may have the ability to modify state table 500A to change one or more of the activity level values, add or delete use cases, add or delete components, etc. Additionally, it will be understood that rather than a single state table 500A as illustrated in FIG. 5A, the information in state table 500A may instead be distributed into multiple different tables, such as an individual state table (not shown) for each component of the SoC 102. State table 500A may be a look-up table. State table 500A may be stored or contained in monitor module 114 in an embodiment, or may be stored in a memory and accessed by monitor module 114, such as when monitor module 114 is implemented in software.

In addition to, or instead of, the information about the use case, the monitor module 114 may receive or obtain information from the buffers themselves (such as FIFOs 250A-250I of FIG. 2) that may indicate that the buffer(s) need to be resized, or that may be used in the determination to resize one or more buffer(s). For example, when a FIFO 250A-250I has begun to fill up with data, or contains data above a threshold level, the FIFO 250A-250I may send a signal indicating it is running out of space, which signal may be received by the monitor module 114.

Returning to FIG. 3, as part of determining or understanding the use case, or as part of a separate determination after the use case is understood, the monitor module 114 may contain or may receive or obtain information to determine an amount to resize one or more buffers. For example, depending on an activity level or expected activity level or "state" of a component, for a particular use case, the monitor module 114 may determine an amount to resize the buffer for that component.

In an embodiment, such determination may be binary—i.e. if the component is "active" size the buffer to depth "A" and if the component is "inactive" size the buffer to depth "B." In some implementations of this embodiment, depths "A" and "B" may be a fixed value for each component of the SoC 102—in other words every active component has its buffer resized to depth "A" and every inactive component has its buffer resized to depth "B" where the values of "A" and "B" are the same for all of the components. In such implementations the value of "B" may be a fraction of "A" such as 50% of depth "A." In other implementations of this embodiment, the values of "A" and "B" may vary from component to component.

In a different embodiment, the determination of the amount to resize the buffer may not be binary—i.e. the amount the buffer is resized may depend on the relative activity level of the component. In such embodiments, the relationship of activity level to buffer size may be stored in a table, such as look up table (LUT) 500B of FIG. 5B. As illustrated in the exemplary LUT 500 of FIG. 5B, each activity level or state of a component for a particular use case results in a different reduction in buffer size (such as reduction in one or more of FIFOs 250A-250I of FIG. 2).

In some embodiments buffer size information for all of the components of the SoC 102 may be governed by a single table such as LUT 500B. In other embodiments, each component of the SoC 102 may have an individual LUT 500B, and that the buffer size reduction values may vary for each component. For example, state F1 for camera 248 may result in a 50% reduction in buffer size, while state F1 for GPU 282 may result in a 25% reduction as illustrated in LUT 500B. LUT 500B may be stored in monitor module 114, or may be stored in a memory and accessed by monitor module 114, such as when monitor module 114 is implemented in software. In some embodiments LUT 500B may be fixed, while in other embodiments monitor module 114 or another component may have the ability to modify LUT 500B to add or delete activity levels, change the buffer size reduction values for one or more activity levels, etc.

Figure 6:
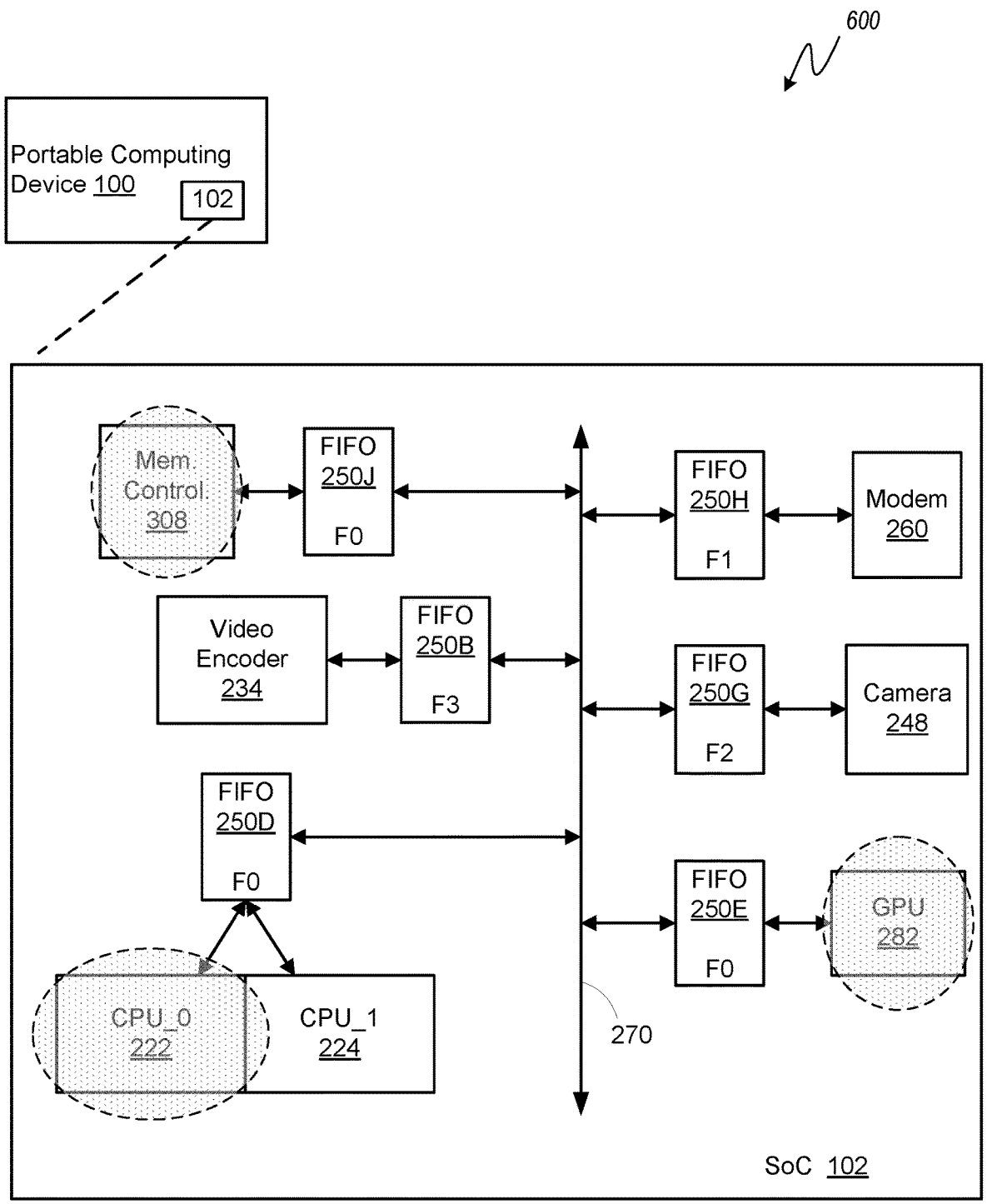
FIG. 6 is a block diagram showing exemplary components in an SoC and additional aspects of an example operation of a system and method for dynamic FIFO buffer sizing for a use case.

Turning to FIG. 6, a block diagram illustrating exemplary components of an SoC 102 during the operation of a system and method for dynamic FIFO buffer sizing for another "gaming" use case. For the "gaming" use case of FIG. 6, it is be expected that the memory controller 308, GPU 282, and CPU 222 will be the most active components as reflected by the shaded region of FIG. 6. The buffers for these active components FIFO 250E (for GPU 282), FIFO 250D (for CPU 222) and FIFO 250J (for memory controller 308) will be sized to accommodate the expected activity level—i.e. relatively larger buffer depth. This is reflected in FIG. 6 with the indication that FIFO 250D, 250E, and 250J will be sized for activity level F0. As indicated in the LUT 500B of FIG. 5B, activity level F0 for this example corresponds to a buffer reduction size of 0%—i.e. a full/maximum sized buffer.

Continuing with this "gaming" use case example, it is expected that the memory controller 308 will be the next most active component. The buffer FIFO 250H for the modem will be sized to accommodate this expected activity level a reflected in FIG. 6 with the indication that FIFO 250H will be sized for activity level F1. As indicated in the LUT 500B of FIG. 5B, activity level F1 for this example corresponds to a buffer reduction size of 25%—i.e. a slightly reduced buffer size.

Similarly, it is expected that the camera 248 will be even less active for this "gaming" use case and the FIFO 250G for camera 248 in FIG. 6 is sized for activity level F2. Activity level F2 for this example corresponds to a buffer reduction size of 50%—i.e. a smaller buffer depth than either state F0 or F1. CPU 222-228, modem 260, and video encoder 234 will be moderately active. Finally, it is expected that the video encoder 234 will be the least active component in this exemplary use case and FIFO 250B for video encoder 234 is sized for activity level F3 corresponding to a 75% reduction in buffer size or depth.

Thus, for the components that are expected to be less active for this use case, the size or depth of the buffers coupled to these components may be reduced, preventing or reducing leakage power without impacting the performance of the PCD. Again the dynamic sizing of the buffers in this additional "gaming" use case example provides additional power savings/power reduction beyond the power savings/power reductions that may be available from traditional voltage/frequency based power reduction methods applied to the inactive components of the SoC 102.

FIG. 6 provides an illustrative example of how buffers may be dynamically changed based on the use case, or a change in the use case. As will be understood, different use cases may result in the buffers being sized differently than indicated in FIG. 6. Additionally, in some embodiments, a designation of the same state or activity level for the buffers of two different components (such as F0 for FIFO 250J of memory controller 3078 and FIFO 250E for GPU 282) may not indicate that the buffers are sized the same. In other words, state F0 for the memory controller 308 buffer (FIFO 250J) may correspond to one buffer size or depth, while state F0 for the GPU 282 buffer (FIFO 250E) may correspond to a different size or depth.

Figure 7A:
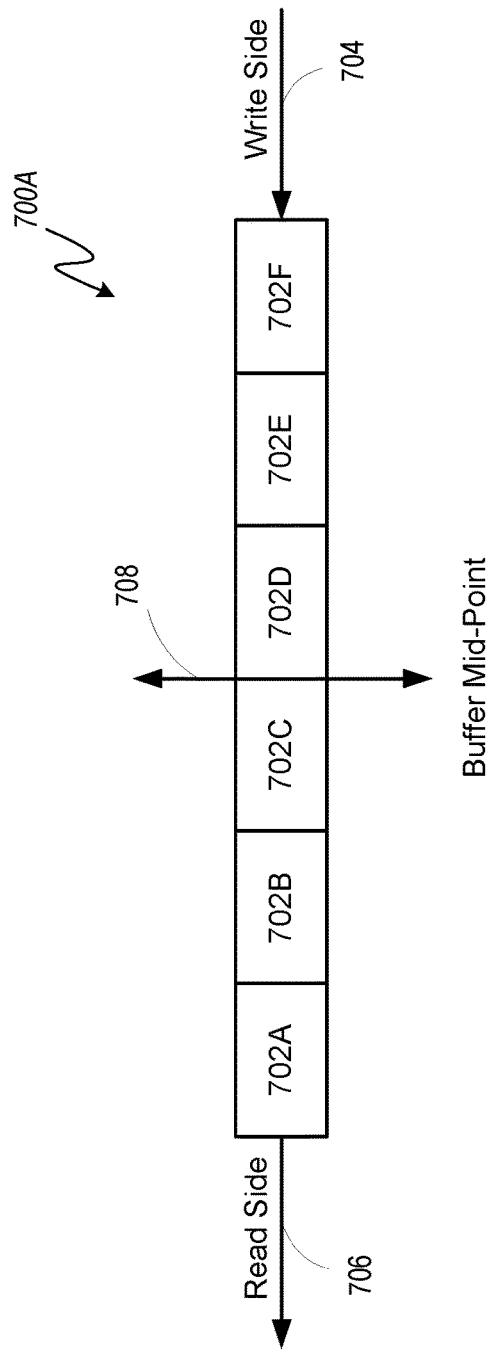
FIG. 7A is a block diagram showing aspects of a FIFO with a first size.

Turning to FIG. 7A a block diagram of aspects of an exemplary FIFO 700A with a first size or depth. FIFO 700A may be a buffer such as FIFOs 250A-250J discussed above. In the example of FIG. 7A FIFO 700A is at the fullest/maximum size or buffer depth, and is comprised of a plurality of registers or memory addresses (referred to herein as portions 702A-702F). As illustrated in FIG. 7A, FIFO 700A has a write side 704 into which data may be placed for buffering and a read side 706 from which the component coupled to FIFO 770A may read the buffered data. Additionally, there is a mid-point 708 reflecting the "middle" FIFO 770A—i.e. the location where the number of portions 702A-702C on one side of the mid-point 708 is equal to the number of portions 702D-702F on the other side of mid-point 708.

Figure 7B:
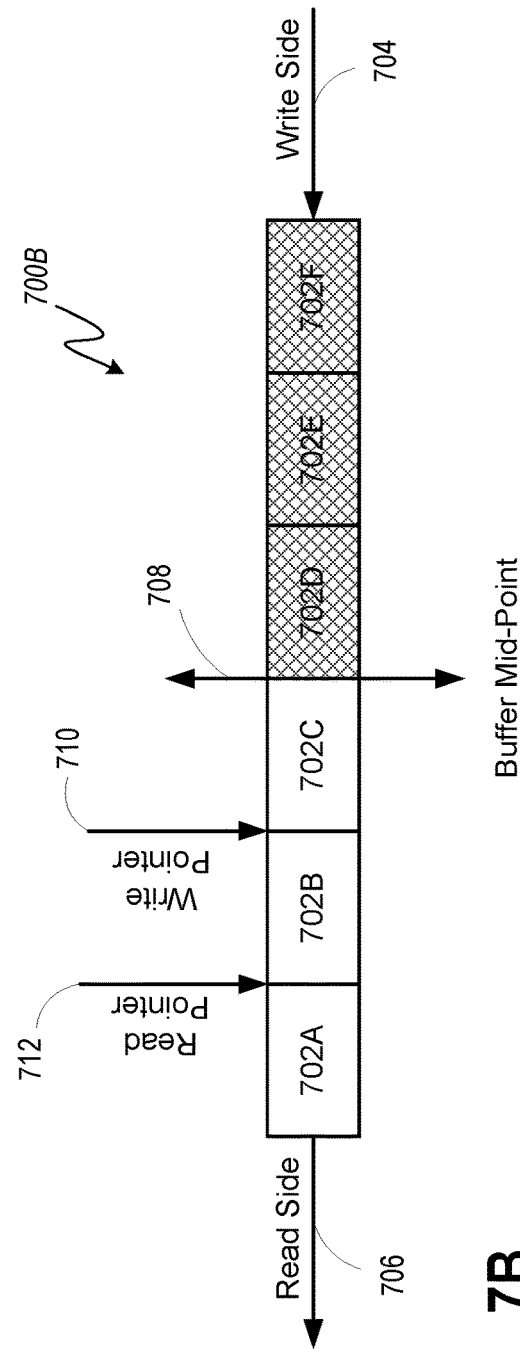
FIG. 7B is a block diagram showing aspects of the FIFO of FIG. 6A after resizing according to exemplary systems and methods herein.

FIG. 7B illustrates the FIFO 700A of FIG. 7B after it has been reduced to a second size or depth (FIFO 700B). As indicated in FIG. 7B one mechanism for reducing the size or depth of a buffer in accordance with the systems and methods disclosed herein is to wait until both the write pointer 710 and the read pointer 712 are on the same side of mid-point 708 and then turning off or power gating one or more portions 702D-702E on the other side of mid-point 708.

In the example of FIG. 7B, a 50% reduction in buffer size or depth is accomplished by waiting until write pointer 710 and read pointer 712 are on the left or read side 706 of mid-point 708. A single power switch may then be operated to turn off portions 702D-702F (i.e. the right half of FIFO 700B) to reduce FIFO 770B to one half of the size or depth of FIFO 770A of FIG. 7A as indicated by the hatching on portions 702D-702F. As will be understood, a similar mechanism may be used to achieve any reduction in buffer size or depth desired (e.g. 25%, 50%, 75%, 85%, etc.). As will also be understood, at a later point in time FIFO 770B may be returned to the larger size by the power switch operating to turn back on portions 702D-702F.

In other implementations, the same FIFO 700B may also be reduced to varying sizes or depths with the implementation of addition power switches or power gates. For example, a first power switch to turn off a first portion 702F may result in a reduction in buffer size or depth of 25% for FIFO 700B. A second power switch to also turn off a second portion 702E may result in a reduction in buffer size or depth of 50% for FIFO 700B. At a later point in time FIFO 770B may be returned to a larger size by the power switch(es) operating to turn back on one or more of portions 702D-702F to enlarge FIFO 770B to the desired size or depth.

Figure 8:
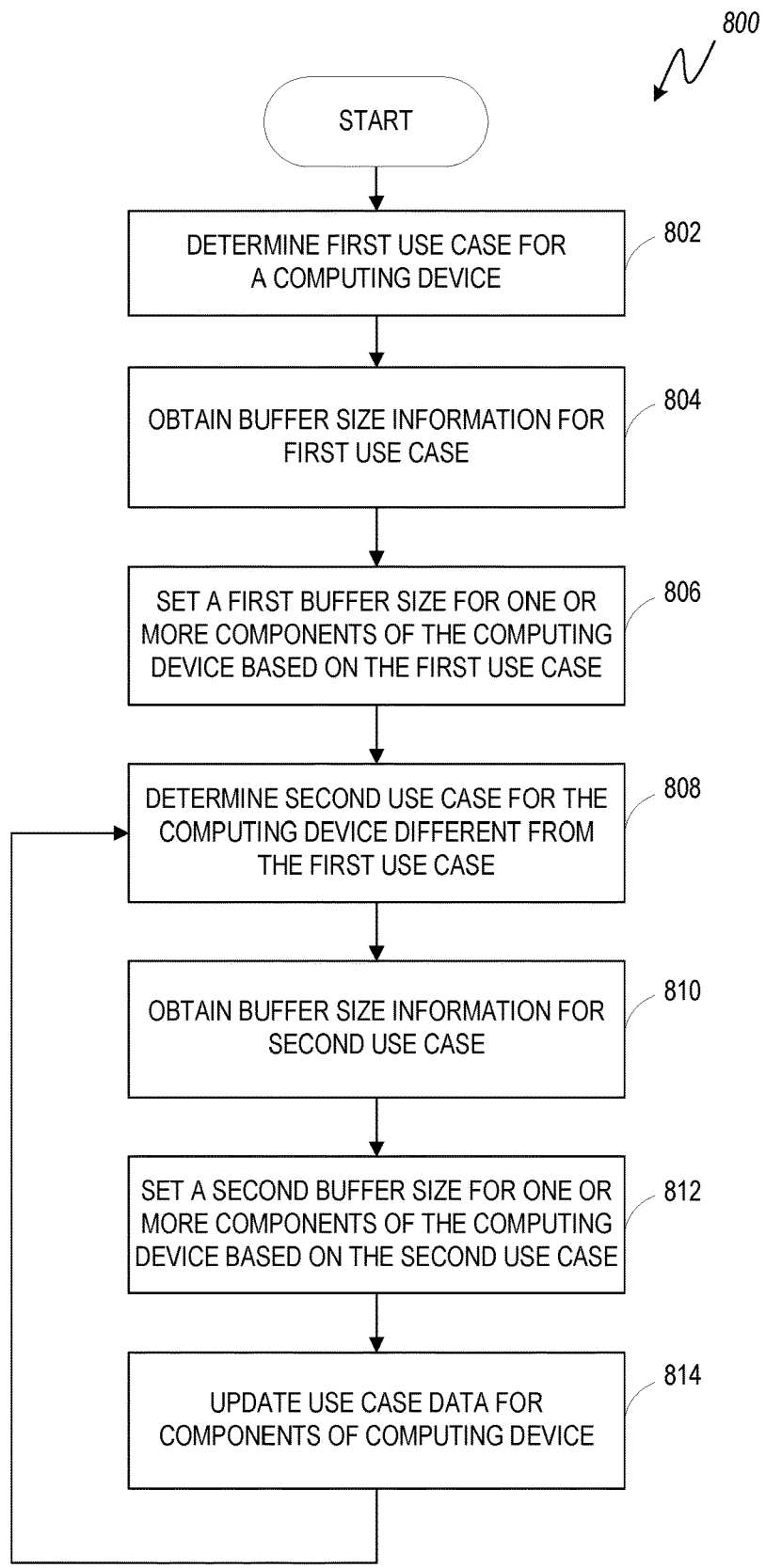
FIG. 8 is a logical flowchart illustrating the operation of an exemplary method for dynamic FIFO buffer sizing in a computing device.

It may be desirable in some embodiments to provide multiple power switches to allow variable reductions in buffer size or depth of a particular FIFO 700B. In other embodiments, the additional costs, power, etc., of each power switch and/or control circuitry needed to variably control the buffer size or depth of a particular FIFO 700B may not be warranted. In such embodiments a single power switch to allow a single reduction size (such as a reduction by 50% for example) may be more desirable. Whether such variable control of buffer size or depth is desirable may depend on a variety of factors, including the component of the SoC 102 for which a buffer will be used, the expected power savings from reducing the size of the particular buffer, etc. FIGS. 7A-7B illustrate one mechanism for dynamically adjusting the size of FIG. 8 is a logical flowchart illustrating the operation of an exemplary method 800 for dynamically controlling buffer size in a computing device. Method 800 begins in block 802 with a determination of a first use case for a computing device, such as PCD 100. The first use case may be one of a plurality of use cases. The plurality of use cases may be pre-defined and set in some embodiments, while in other embodiments the plurality of use cases may change or be altered over time. The determination of block 802 may be the identification of a particular use case that applies for how the PCD 100 is currently being operated. In some embodiments the determination of block 802 may be of a default use case in the event that the current operation of the PCD 100 does not fit the other pre-defined use cases.

The determination of the first use case in block 802 may be made by the monitor module 114 in an embodiment (see FIG. 3), and the monitor module 114 in such embodiments may receive or obtain information from various components to determine or understand which use case applies for how the PCD 100 is currently being used. Such received information may include the present activity level of one or more components in the PCD 100 or SoC 102 (such as GPU 282, camera 248, modem 260, video encoder 232, etc. of FIG. 2 and/or FIG. 3).

The determination in block 802 may additionally, or alternatively, be based on knowledge of or information about the applications or programs being executed by the PCD 100, or that are about to be executed by the PCD 100. Such knowledge or information may be direct (such as software understanding which applications, instructions, or code are executing on the SoC 102) or may be inferred (such as based on user inputs). The determination in block 802 may also additionally, or alternatively, be based on a triggering event, such as re-starting the PCD 100 or SoC 102 from a powered-off state.

Method 800 continues to block 804 where buffer size or depth information for the first use case is obtained. The buffers(s) may be FIFOs 250A-250J discussed above for FIGS. 4A-4B and FIG. 6. Depending on the use case determined in block 802 various components of SoC 102 may be expected to be more or less active. In block 804, values for the buffer size or depth for each FIFO 250A-250J associated with the various components of SoC 102 is obtained or determined for the first use case.

In some embodiments, obtaining the buffer size information in block 804 may comprise reading the buffer size information from one or more tables. For example, an expected state or activity level for one or more components may be obtained for the determined use case from a table such as state table 500A of FIG. 5A. As discussed above rather than a single table 500A, different state tables (not shown) may be kept for each component of SoC 102 in some implementations. Additionally, or alternatively, a size reduction value for one or more buffers (each buffer associated with a component in one embodiment) may be obtained from a table such as LUT 500B of FIG. 5B. As will be understood, other ways of obtaining buffer size or depth information for the first use case may be implemented rather than tables. Additionally, in some embodiments, block 804 may not be a separate step but instead may be part of the determination of block 802.

Method 800 continues to block 806 where, based on the determined first use case and the obtained buffer size information, a first buffer size is set for buffer(s) associated with one or more components of the computing device. The buffers(s) may be FIFOs 250A-250J discussed above for FIGS. 4A-4B and FIG. 6. Depending on the use case determined in block 802 various components of SoC 102 may be expected to be more or less active. In block 806, the buffer size or depth for each FIFO 250A-250J associated with the various components of SoC 102 is adjusted as needed in accordance with the determined use case and obtained buffer size information.

In an embodiment, this may include reducing the buffer size or depth of components expected to be less active or inactive and/or increasing the buffer size or depth of components expected to be more active. As discussed above, the amount of buffer size or depth increase or decrease may vary by component and/or by use case. The buffer size adjustment may be accomplished by any desire mechanism, such as the mechanism discussed for FIGS. 7A-7B above. Additionally, such buffer size adjustment may be accomplished in addition to, or instead of, any other power mitigation or control strategies that the PCD 100 or SoC 102 is implementing.

In block 808 a second use case, different from the first use case, is determined for the computing device. This determination of block 808 may be made in the same manner as the determination discussed above for block 802 in response to changing conditions in components of the PCD 100 and/or a change in how PCD 100 is being used. By way of example, the PCD 100 may change from a "gaming" use case to a "communication" use case, such as when a use stops playing a game on the PCD 100 to make or receive a telephone call on the PCD 100. In block 808 this change in use case and/or changing operation of the PCD 100 is detected or determined, such as by monitor module 114. As discussed above, monitor module 114 may be implemented in software.

The determination in block 808 may be made based on information from various components to determine or understand that the PCD 100 use/status has changed and to determine which use case applies to how the PCD 100 is currently being used. Such received information may include the present activity level of one or more components in the PCD 100 or SoC 102 (such as GPU 282, camera 248, modem 260, video encoder 232, etc. of FIG. 2 and/or FIG. 3). The determination in block 808 may additionally, or alternatively, be based on knowledge of or information about the applications or programs being executed by the PCD 100, that have stopped executing on the PCD 100, and/or that are about to be executed by the PCD 100. Such knowledge or information may be direct (such as software understanding which applications, instructions, or code are executing on the SoC 102) or may be inferred (such as based on user inputs).

The determination in block 808 may also additionally, or alternatively, be based on a triggering event, such as re-starting the PCD 100 or SoC 102 from a previous powered-off state. Like block 802 above, the determination of block 808 may be the identification of a particular second use case for how the PCD 100 is currently being operated different from the first use case. In some embodiments the determination of block 806 may be of a default use case in the event that the current operation of the PCD 100 does not fit the other pre-defined use cases.

Method 800 continues to block 810 where buffer size or depth information for the second use case is obtained. The buffers(s) may be FIFOs 250A-250J discussed above for FIGS. 4A-4B and FIG. 6. Depending on the second use case determined in block 808 various components of SoC 102 may be expected to be more or less active than they were for the first use case. In block 810, new values for the buffer size or depth for each FIFO 250A-250J associated with the various components of SoC 102 is obtained or determined for the second use case. It is expected that for one or more of the buffers these new, second values for the buffer size or depth may be different from the first values for the buffer size or depth obtained or set for the first use case.

In some embodiments, obtaining the new or second buffer size information in block 810 may comprise reading the buffer size information from one or more tables such as state table 500A of FIG. 5A and/or LUT 500 of FIG. 5B as discussed for block 804. As will be understood, other ways of obtaining buffer size or depth information for the second use case may be implemented rather than tables. Additionally, in some embodiments, block 810 may not be a separate step but instead may be part of the determination of block 808.

In block 812 a second buffer size is set for buffer(s) associated with one or more components of the computing device where, based on the determined second use case and the buffer size information obtained for the second use case. The buffers(s) may again be FIFOs 250A-250J discussed above for FIGS. 4A-4B and FIG. 6. Depending on the use case determined in block 808 various components of SoC 102 may be expected to be more or less active. In block 812, the buffer size or depth for each FIFO 250A-250J associated with the various components of SoC 102 is adjusted as needed in accordance with the determined second use case.

In an embodiment, this may include reducing the buffer size or depth of components expected to be less active or inactive and/or increasing the buffer size or depth of components expected to be more active in the second use case. As discussed above, the amount of buffer size or depth increase or decrease may vary by component and/or by use case. Additionally, such buffer size adjustment may be accomplished in addition to, or instead of, any other power mitigation or control strategies that the PCD 100 or SoC 102 is implementing.

Method 800 continues to optional block 814 where use case data or information for one or more components of the computing device may be updated if needed. For embodiments where the plurality of use cases may change over time, such changes may be tracked (for example by monitor module 114) and may be made from time to time in block 814. Changes to the use case information may result from data gathered over time during operation of the PCD 100 about how the PCD 100 is used. Such changes to use case information in block 814 may include deleting use cases, adding new use cases, changing the activity level of one or more components for a use case, changing the buffer size or depth for a particular activity level for one or more components, or any combination thereof.

For embodiments where the plurality of use cases is pre-determined and may not be changed, block 814 may not be performed or may only be performed in part. For example, in some embodiments, use cases may not be added or deleted, but activity level values and/or buffer size information for activity levels may be updated. Method 800 then continues to monitor the status of the PCD 100 and/or the components of SoC 102 to determine any future or further changes in the use case. In the event of such future changes blocks 808, 810, 812, and/or 814 may re-iterate for a third use case, fourth use case, etc. as described above.

FIG. 8 describes only one exemplary embodiment of a method 800 dynamic buffer resizing in a computing device such as PCD 100. In other embodiments, additional blocks or steps may be added to method 800. Similarly, in some embodiments various blocks or steps shown in FIG. 8 may be combined or omitted, such as for example combining blocks 802 and 804 into one predicting/obtaining block or step rather than the two separate blocks illustrated in FIG. 8. Alternatively, blocks 804 and 806 could be combined into one obtaining/setting buffer size block or step rather than the two separate blocks illustrated in FIG. 8. Such variations of the method 800 are within the scope of this disclosure.

Additionally, certain steps in the processes or process flows described in this specification naturally precede others for the invention to function as described. However, the disclosure is not limited to the order of the steps described if such order or sequence does not alter the functionality. Moreover, it is recognized that some steps may performed before, after, or in parallel (substantially simultaneously) with other steps without departing from the scope of this disclosure. In some instances, certain steps may be omitted or not performed without departing from the scope of the disclosure. Further, words such as "thereafter", "then", "next", "subsequently", etc. are not intended to limit the order of the steps. These words are simply used to guide the reader through the description of the exemplary method 800.

The various operations and/or methods described above may be performed by various hardware and/or software component(s) and/or module(s), and such component(s) and/or module(s) may provide the means to perform such operations and/or methods. Additionally, one of ordinary skill in programming is able to write computer code or identify appropriate hardware and/or circuits to implement the disclosed method or system without difficulty based on the flow charts and associated description in this specification, for example.

Therefore, disclosure of a particular set of program code instructions or detailed hardware devices is not considered necessary for an adequate understanding of how to make and use the disclosed system or method. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disc and Blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the scope of the present disclosure, as defined by the following claims.

What is claimed is:

1. A method for dynamically controlling buffer size in a computing device in a portable computing device ("PCD"), the method comprising:

determining with a monitor module of a system on a chip ("SoC") a first use case for the PCD, a plurality of components of the SoC collectively being operable in the first use case, each of the plurality of components having a first activity level in the first use case, the PCD being powered by a battery and comprising a hand-held device;

setting each of a plurality of buffers to a non-zero first buffer size based on the first use case, wherein
each of the plurality of buffers is associated one of the plurality of components of the SoC,
the first buffer size for each of the buffers is based on the first activity level and power consumption of the associated component of the SoC; a depth of at least one buffer for the first buffer size is decreased by turning off power or by gating a portion of the at least one buffer based on reduced activity and reduced power consumption of an associated component during the first activity level;

determining with the monitor module a second use case for the PCD different from the first use case, the plurality of components of the SoC collectively being operable in the second use case, each of the plurality of components having a second activity level in the second use case; and setting each of the plurality of buffers to a non-zero second buffer size based on the second use case, wherein the second buffer size for each buffer is based on the second activity level and power consumption of the associated component of the SoC, the second buffer size different from the first buffer size; a depth of at least one buffer for the second buffer size is decreased by turning off power or by gating a portion of the at least one buffer based on reduced activity and reduced power consumption of an associated component during the second activity level, such that decreased depth of buffers during the first and second use cases reduces overall power consumption of the PCD and improves life of the battery.

2. The method of claim 1, wherein setting each of the plurality of buffers to a second buffer size based on the second use case comprises:
reducing the buffer depth of at least one of the plurality of buffers by a variable amount depending on the second activity level of the associated component of the SoC.

3. The method of claim 1, wherein the first buffer size associated with a first of the plurality of components that supports the first use case of the SoC is different than a first buffer size associated with a second of the plurality of components of the SoC that do not support the first use case.

4. The method of claim 1, wherein the plurality of buffers comprise first-in-first-out (FIFO) buffers.

5. The method of claim 1, wherein:
setting each of the plurality of buffers to the first buffer size based on the first use case further comprises obtaining a first size information for each of the plurality of buffers for the first use case, and
setting each of the plurality of buffers to the second buffer size based on the second use case, further comprises obtaining a second size information for each of the plurality of buffers for the second use case.

6. The method of claim 1, further comprising:
updating use case data for one or more of the plurality of components of the SoC, wherein updating use case data comprises adding a new use case, deleting one of the plurality of use cases, changing an activity level value for one or more use cases, changing a size information value for one or more of the activity levels for one or more of the use cases, or a combination thereof.

7. The method of claim 1, further comprising:
determining with the monitor module an N use case for the PCD different from the N−1 use case, where N is an integer greater than 2, the N use case defining an N activity level for the plurality of components of the SoC; and
setting at least one of the plurality of buffers to an N buffer size based on the N use case, wherein the N buffer size for the at least one buffer is based on the N activity level of the associated component of the SoC, the N buffer size different from the N−1 buffer size.

8. The method of claim 1, further comprising:
determining if one or more of the use cases has changed over time by monitoring data associated with components for a particular use case; and
in response to determining that one or more use cases has changed over time, then changing use case data by at least one of: deleting a use case, adding a new use case, and changing a tracked activity level for one or more components of a particular use case.

9. A computer system for dynamically controlling buffer size in a computing device in a portable computing device ("PCD"), the system comprising:
a plurality of components of a system on a chip ("SoC") of the PCD, the PCD being powered by a battery and comprising a hand-held device;
a plurality of buffers on the SoC, each of the plurality of buffers associated with one of the plurality of components; and
a monitor module of the SoC, the monitor module configured to:
determine a first use case for the PCD, the plurality of components of the SoC collectively being operable in the first use case, each of the plurality of components having a first activity level in the first use case,
set each of the plurality of buffers to a non-zero first buffer size based on the first use case, the first buffer size for each of the buffers based on the first activity level and power consumption of the associated component of the SoC, a depth of at least one buffer for the first buffer size is decreased by turning off power or by gating a portion of the at least one buffer based on reduced activity and reduced power consumption of an associated component during the first activity level;
determine a second use case for the PCD different from the first use case, the plurality of components of the SoC collectively being operable in the second use case, each of the plurality of components having a second activity level in the second use case, set each of the plurality of buffers to a non-zero second buffer size based on the second use case, wherein the second buffer size for each buffer is based on the second activity level and reduced power consumption of the associated component of the SoC, the second buffer size different from the first buffer size;
a depth of at least one buffer for the second buffer size is decreased by turning off power or by gating a portion of the at least one buffer based on reduced activity and power consumption of an associated component during the second activity level, such that decreased depth of buffers during the first and second use cases reduces overall power consumption of the PCD and improves life of the battery.

10. The computer system of claim 9, setting each of the plurality of buffers to a second buffer size based on the second use case comprises reducing the buffer depth of at least one of the plurality of buffers by a variable amount depending on the second activity level of the associated component of the SoC.

11. The computer system of claim 9, wherein the first buffer size associated with a first of the plurality of components of the SoC that supports the first use case is different than the first buffer size associated with a second of the plurality of components of the SoC that do not support the first use case.

12. The computer system of claim 9, wherein the plurality of buffers comprise first-in-first-out (FIFO) buffers.

13. The computer system of claim 9, wherein the monitor module is further configured to:
set the plurality of buffers to the first buffer size based on the first use case by obtaining a first size information for the plurality of buffers for the first use case, and
set at the least one of the plurality of buffers to the second buffer size based on the second use case by obtaining a second size information for the plurality of buffers for the second use case.

14. The computer system of claim 13, wherein the monitor module is further configured to:
update use case data for one or more of the plurality of components of the SoC, wherein updating use case data comprises adding a new use case, deleting one of the plurality of use cases, changing an activity level value for one or more use cases, changing a size information value for one or more of the activity levels for one or more of the use cases, or a combination thereof.

15. The computer system of claim 9, wherein the monitor module is further configured to:
determine an N use case for the PCD different from the N−1 use case, where N is an integer greater than 2, the N use case defining an N activity level for the plurality of components of the SoC, and
set at least one of the plurality of buffers to an N buffer size based on the N use case, wherein the N buffer size for the at least one buffer is based on the N activity level of the associated component of the SoC, the N buffer size different from the N−1 buffer size.

16. The computer system of claim 9, wherein the monitor module is further configured to:
determine if one or more of the use cases has changed over time by monitoring data associated with components for a particular use case; and in response to determining that one or more use cases has changed over time, then change use case data by at least one of: deleting a use case, adding a new use case, and changing a tracked activity level for one or more components of a particular use case.

17. A computer system for dynamically controlling buffer size in a computing device in a portable computing device ("PCD"), the system comprising:
   means for determining with a monitor module of a system on a chip ("SoC") a first use case for the PCD, a plurality of components of the SoC collectively being operable in the first use case, each of the plurality of components having a first activity level in the first use case, the PCD being powered by a battery and comprising a hand-held device;
   means for setting each of a plurality of buffers to a non-zero first buffer size based on the first use case, wherein
      each of the plurality of buffers is associated one of the plurality of components of the SoC,
      the first buffer size for each of the buffers is based on the first activity level and power consumption of the associated component of the SoC; a depth of at least one buffer for the first buffer size is decreased by turning off power or by gating a portion of the at least one buffer based on reduced activity and reduced power consumption of an associated component during the first activity level;
   means for determining with the monitor module a second use case for the PCD different from the first use case, the plurality of components of the SoC collectively being operable in the second use case, each of the plurality of components having a second activity level in the second use case; and
   means for setting each of the plurality of buffers to a non-zero second buffer size based on the second use case, wherein the second buffer size for each buffer is based on the second activity level and power consumption of the associated component of the SoC, the second buffer size different from the first buffer size; a depth of at least one buffer for the second buffer size is decreased by turning off power or by gating a portion of the at least one buffer based on reduced activity and reduced power consumption of an associated component during the second activity level, such that decreased depth of buffers during the first and second use cases reduces overall power consumption of the PCD and improves life of the battery.

18. The computer system of claim 17, wherein the means for setting each of the plurality of buffers to a second buffer size based on the second use case comprises:
   means for reducing the buffer depth of at least one of the plurality of buffers by a variable amount depending on the second activity level of the associated component of the SoC.

19. The computer system of claim 17, wherein the first buffer size associated with a first of the plurality of components that supports the first use case of the SoC is different than a first buffer size associated with a second of the plurality of components of the SoC that do not support the first use case.

20. The computer system of claim 17, wherein the plurality of buffers comprise first-in-first-out (FIFO) buffers.

21. The computer system of claim 17, wherein:
   the means setting the plurality of buffers to the first buffer size based on the first use case further comprises means for obtaining a first size information for the plurality of buffers for the first use case, and
   the means for setting at the least one of the plurality of buffers to the second buffer size based on the second use case, further comprises means for obtaining a second size information for the plurality of buffers for the second use case.

22. The computer system of claim 17, further comprising:
   means for updating use case data for one or more of the plurality of components of the SoC, wherein updating use case data comprises adding a new use case, deleting one of the plurality of use cases, changing an activity level value for one or more use cases, changing a size information value for one or more of the activity levels for one or more of the use cases, or a combination thereof.

23. The computer system of claim 17, the system further comprising:
   means for determining if one or more of the use cases has changed over time by monitoring data associated with components for a particular use case; and
   means for changing use case data by at least one of: deleting a use case, adding a new use case, and changing a tracked activity level for one or more components of a particular use case in response to determining that one or more use cases has changed over time.

24. A computer program product comprising a non-transitory computer usable medium having a computer readable program code embodied therein, said computer readable program code adapted to be executed to implement a method for dynamically controlling buffer size in a computing device in a portable computing device ("PCD"), the method comprising:
   determining with a monitor module of a system on a chip ("SoC") a first use case for the PCD, a plurality of components of the SoC collectively being operable in the first use case, each of the plurality of components having a first activity level in the first use case, the PCD being powered by a battery and comprising a hand-held device;
   setting each of a plurality of buffers to a non-zero first buffer size based on the first use case, wherein
      each of the plurality of buffers is associated one of the plurality of components of the SoC,
      the first buffer size for each of the buffers is based on the first activity level and power consumption of the associated component of the SoC; a depth of at least one buffer for the first buffer size is decreased by turning off power or by gating a portion of the at least one buffer based on reduced activity and power consumption of an associated component during the first activity level;
   determining with the monitor module a second use case for the PCD different from the first use case, the plurality of components of the SoC collectively being operable in the second use case, each of the plurality of components having a second activity level in the second use case; and
   setting each of the plurality of buffers to a non-zero second buffer size based on the second use case, wherein the second buffer size for each buffer is based on the second activity level and power consumption of the associated component of the SoC, the second buffer size different from the first buffer size; a depth of at least one buffer for the second buffer size is decreased by turning off power or by gating a portion of the at least one buffer based on reduced activity and power consumption of an associated component during the second activity level, such that decreased depth of buffers during the first and second use cases reduces overall power consumption of the PCD and improves life of the battery.

25. The computer program product of claim 24, wherein setting each of the plurality of buffers to a second buffer size based on the second use case comprises:
  reducing the buffer depth of at least one of the plurality of buffers by a variable amount depending on the second activity level of the associated component of the SoC.

26. The computer program product of claim 24, wherein the first buffer size associated with a first of the plurality of components that supports the first use case of the SoC is different than a first buffer size associated with a second of the plurality of components of the SoC that do not support the first use case.

27. The computer program product of claim 24, wherein the plurality of buffers comprise first-in-first-out (FIFO) buffers.

28. The computer program product of claim 24, wherein:
  setting the plurality of buffers to the first buffer size based on the first use case further comprises obtaining a first size information for the plurality of buffers for the first use case, and
  setting at the least one of the plurality of buffers to the second buffer size based on the second use case, further comprises obtaining a second size information for the plurality of buffers for the second use case.

29. The computer program product of claim 28, wherein the method further comprises:
  updating use case data for one or more of the plurality of components of the SoC, wherein updating use case data comprises adding a new use case, deleting one of the plurality of use cases, changing an activity level value for one or more use cases, changing a size information value for one or more of the activity levels for one or more of the use cases, or a combination thereof.

30. The computer program product of claim 24, wherein the method further comprises:
  determining if one or more of the use cases has changed over time by monitoring data associated with components for a particular use case; and
  in response to determining that one or more use cases has changed over time, then changing use case data by at least one of: deleting a use case, adding a new use case, and changing a tracked activity level for one or more components of a particular use case.

* * * * *